(12) United States Patent
Caveney

(10) Patent No.: US 6,647,596 B1
(45) Date of Patent: Nov. 18, 2003

(54) BALL LOCK CABLE TIE HAVING A STRAP APERTURE

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/201,016

(22) Filed: Jul. 23, 2002

Related U.S. Application Data

(60) Provisional application No. 60/377,448, filed on May 2, 2002.

(51) Int. Cl.[7] ............................................. B65D 63/08
(52) U.S. Cl. ............................................. 24/21; 24/25
(58) Field of Search ........................ 24/274 R, 23 R, 24/268, 23 W, 20 R, 21, 136 A, 115 L, 488, 25

(56) References Cited

U.S. PATENT DOCUMENTS

| | | |
|---|---|---|
| 3,015,865 A | 1/1962 | Rapuzzi |
| 3,351,989 A * | 11/1967 | Cheris et al. ............. 24/274 R |
| 3,879,811 A * | 4/1975 | Leverton ................... 24/281 |
| 4,128,919 A | 12/1978 | Bulanda et al. |
| 4,366,602 A | 1/1983 | Conlon et al. |
| 4,399,592 A | 8/1983 | Chopp, Jr. et al. |
| 4,473,925 A | 10/1984 | Jansen |
| 5,103,534 A | 4/1992 | Caveney |
| 5,291,637 A | 3/1994 | Meyers |
| 5,732,446 A | 3/1998 | Blanks |
| 5,759,004 A | 6/1998 | Kuffel |
| 5,850,674 A | 12/1998 | Jansen |
| 6,014,792 A | 1/2000 | Marelin et al. |
| 6,076,235 A | 6/2000 | Khokhar |

* cited by examiner

*Primary Examiner*—James R. Brittain
(74) *Attorney, Agent, or Firm*—Robert A. McCann; Jay A. Saltzman; Christopher S. Clancy

(57) ABSTRACT

A metal cable tie is disclosed. The cable tie includes an elongate metallic strap, a metallic locking head, and metallic roller means. The strap has a first end and a second end opposite the first end. The head is secured to the first end of the strap for receiving the second end of the strap. The head comprises a strap entry face, a strap exit face, and a strap-receiving aperture extending therebetween. The head further comprises a floor and a roof which diverge in the direction of the exit face. The metallic roller means lockingly engages the strap, and the head comprises retention means disposed adjacent the exit face for captively holding the roller means within the head. The roller means is movable between a threading position wherein the roller means is disposed adjacent the exit face and the retention means, and a locking position wherein the roller means is closer the entry face. The first end of the strap comprises an aperture disposed beneath the locking position of the roller means.

23 Claims, 5 Drawing Sheets

BALL LOCK CABLE TIE HAVING A STRAP APERTURE

CROSS-REFERENCE TO RELATED APPLICATIONS

This application claims priority to U.S. Provisional Application Serial No. 60/377,448, filed on May 2, 2002.

BACKGROUND OF THE INVENTION

The present invention is directed to a cable tie, and more particularly, to a three-piece metal cable tie that utilizes a roller means as the locking mechanism.

Metallic bundling devices incorporating locking balls and roller pins have been used for bundling bales of cotton or the like since the Nineteenth Century. None of the prior devices were positive locking, i.e. depending on the orientation of the locking head, gravity could hold the ball out of locking engagement with the strap resulting in release. U.S. Pat. No. 4,399,592 addressed this problem by teaching the addition of a raised portion or protuberance for deflecting the threaded strap away from the floor as the threaded strap exits the locking head. This deflection ensures that the locking ball is in continuous engagement with the threaded strap regardless of the position of the ball or the orientation of the locking head.

It would be desirable to provide a cable tie having improved tensile strength.

It would also be desirable to provide a cable tie strap having an aperture disposed beneath the locking position of the roller means.

SUMMARY OF THE INVENTION

A metal cable tie is disclosed. The cable tie includes an elongate metallic strap, a metallic locking head, and metallic roller means. The strap has a first end and a second end opposite the first end. The head is secured to the first end of the strap for receiving the second end of the strap. The head comprises a strap entry face, a strap exit face, and a strap-receiving aperture extending therebetween. The head further comprises a floor and a roof which diverge in the direction of the exit face. The metallic roller means lockingly engages the strap, and the head comprises retention means disposed adjacent the exit face for captively holding the roller means within the head. The roller means is movable between a threading position wherein the roller means is disposed adjacent the exit face and the retention means, and a locking position wherein the roller means is closer the entry face. The first end of the strap comprises an aperture disposed beneath the locking position of the roller means.

Preferably, the cable tie is made of stainless steel.

Preferably, the strap is coated.

Preferably, the roller means is a ball.

Preferably, the aperture is substantially circular.

Preferably, the diameter of the ball is equal to or greater than the diameter of the aperture.

Preferably, the retention means is a finger extending from the roof adjacent the exit face.

Preferably, the width of the strap is at least twice the width of the aperture.

DETAILED DESCRIPTION OF PREFERRED EMBODIMENTS

The illustrated embodiments of the invention are directed to a three-piece cable tie that utilizes a roller means as the locking mechanism.

Figure 1:
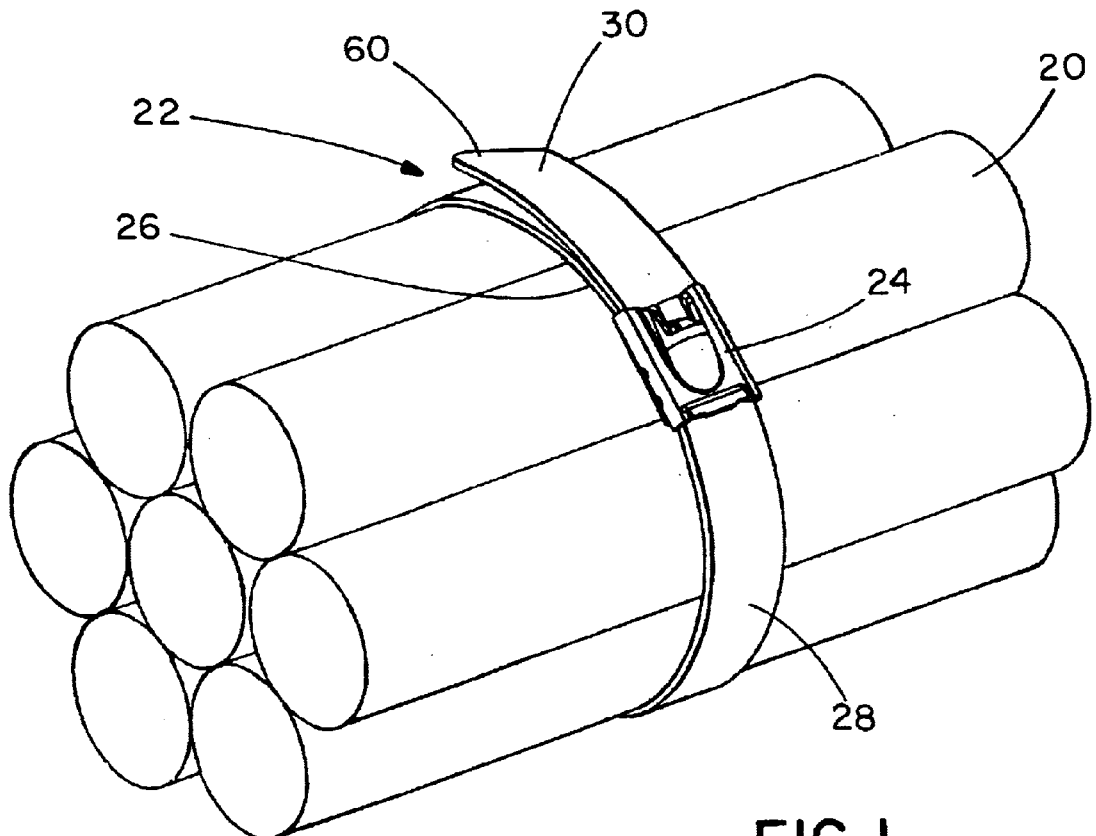
FIG. 1 is a perspective view of the metal tie of the present invention shown secured around a bundle of wires.
Figure 2:
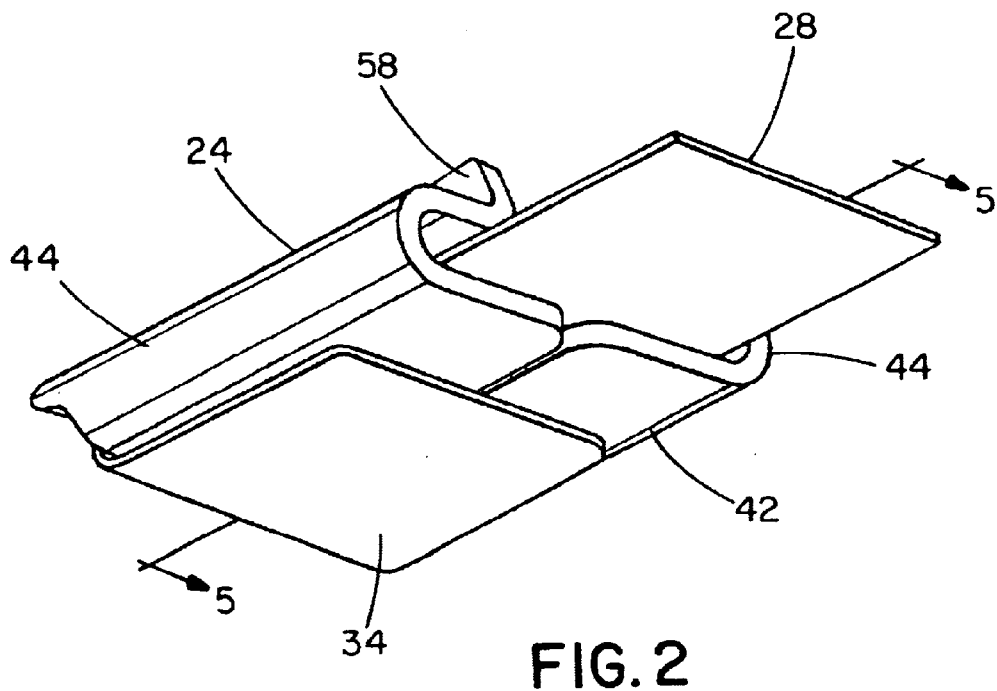
FIG. 2 is a partial perspective view of the underside of the locking head of the cable tie of FIG. 1.

Referring now to the drawings, a cable tie for bundling a plurality of elongate objects, such as wires 20, and for holding objects together is generally indicated in FIG. 1 by reference numeral 22. Cable tie 22 includes a locking head 24 secured to a first end 26 of an elongate strap 28 for receiving a second end 30 of the strap 28, and roller means in the form of a ball or sphere 32, best shown in FIGS. 6–10, for retaining the strap 28 within the locking head 24. Preferably, the ball, head and strap are formed of stainless steel to allow the strap to be used over a wide temperature range and to give the cable tie high strength and excellent resistance to corrosion. Additionally, as known in the art, the strap 28 may be coated.

Figure 3:
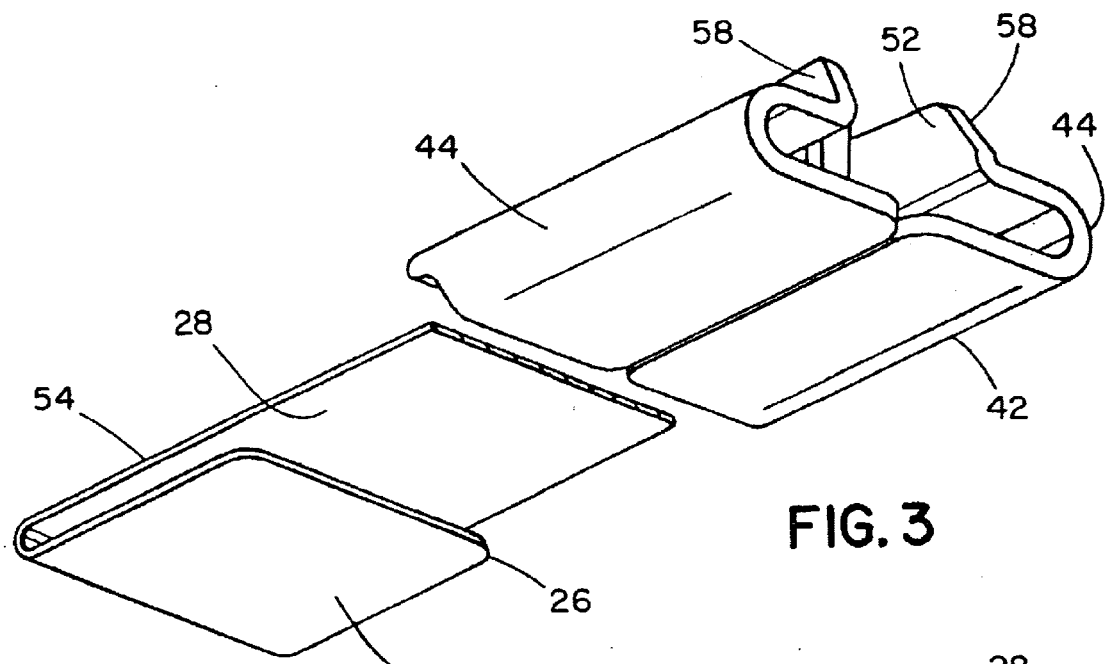
FIG. 3 is an exploded view of FIG. 2 with a strap portion separate from the locking head.
Figure 4:
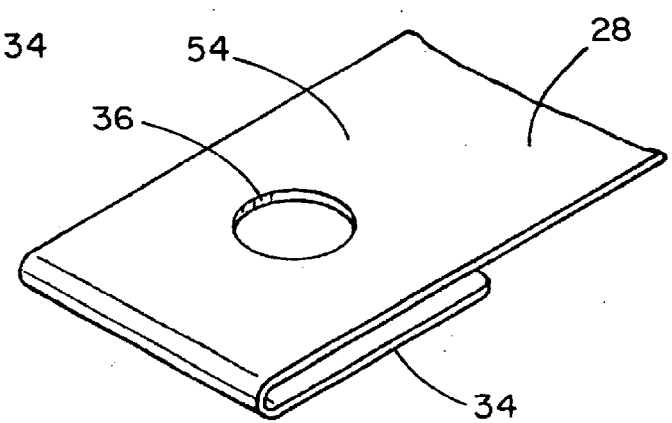
FIG. 4 is a top perspective view of a portion of the strap that engages the head.
Figure 5:
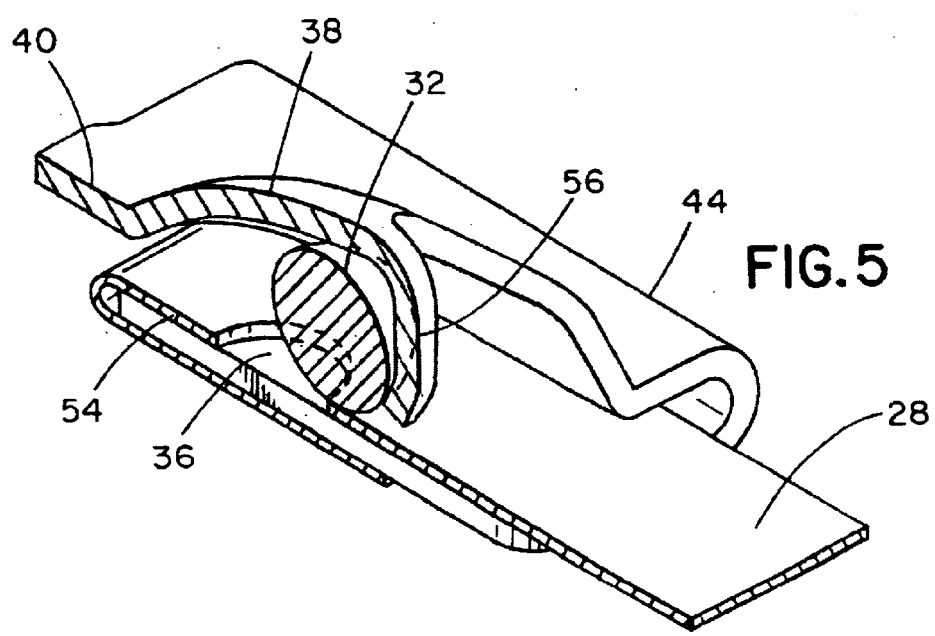
FIG. 5 is a sectional view taken along lines 5—5 of FIG. 2.

The cable tie of the present invention is formed by assembling a locking head 24, a strap 28 and a hooked portion 34 formed integral with the strap 28 as shown in FIG. 3. As best seen in FIG. 4, the strap 28 has an aperture 36. Preferably, as shown in FIG. 4, the width of the strap 28 is at least twice the width of aperture 36. In this embodiment, the width of the strap 28 is 0.312 inches, and the width of the aperture 36 is 0.125 inches.

Figure 11:
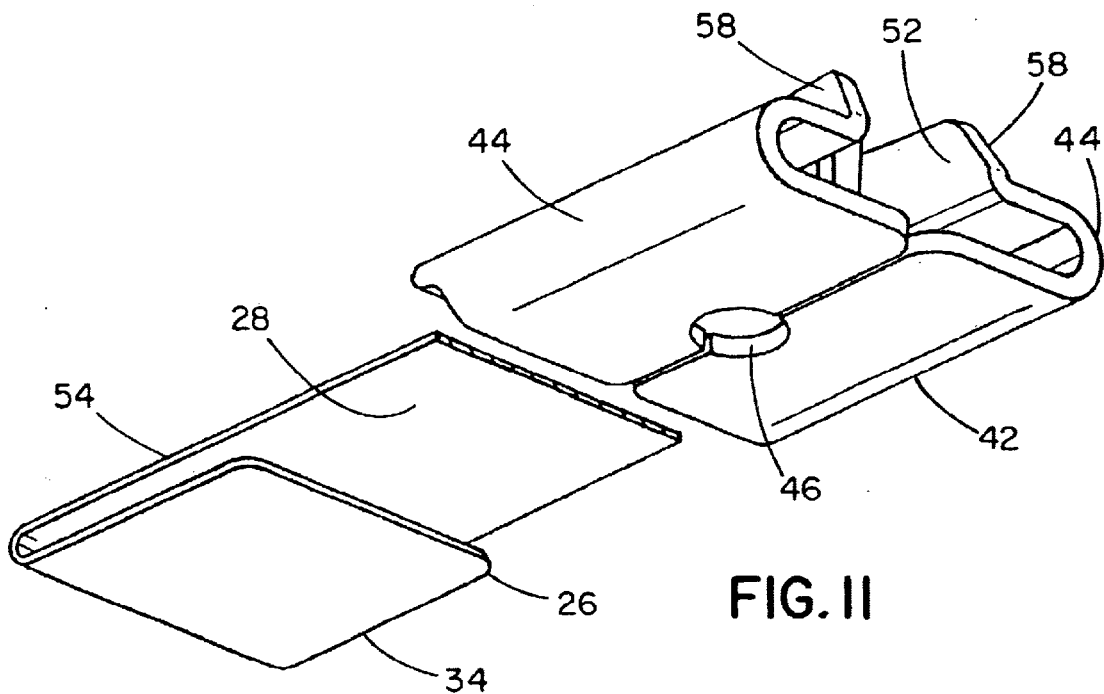
FIG. 11 is a view similar to FIG. 3 in which the locking head has an aperture.
Figure 12:
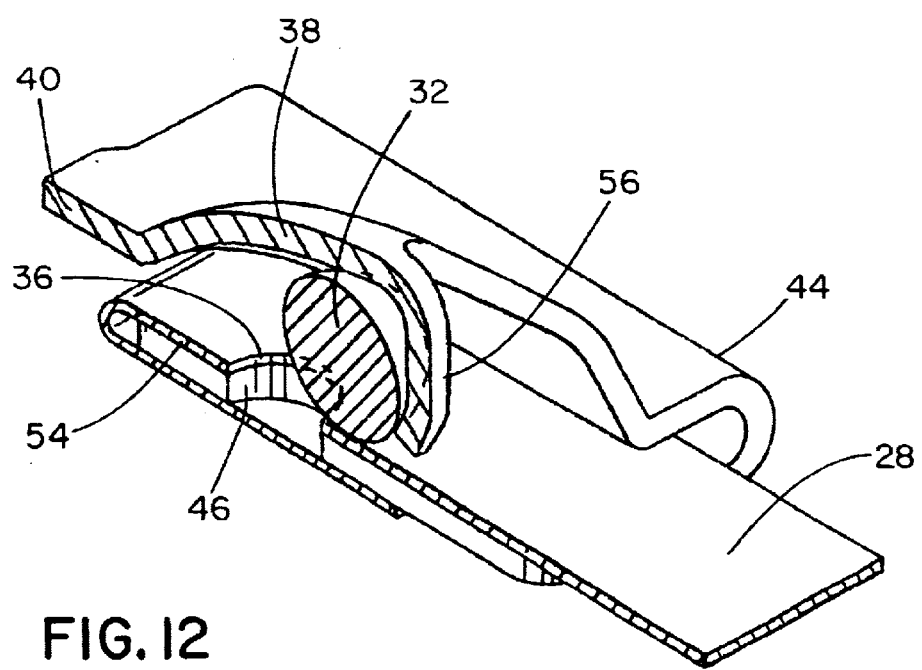
FIG. 12 is a view similar to FIG. 5 in which the locking head has an aperture.

Referring to FIGS. 2–5, locking head 24 comprises a roof 38, a ceiling 40, and a bottom wall 42 with the ceiling 40 and bottom wall 42 joined by a pair of sidewalls 44. As shown in FIGS. 11 and 12, the bottom wall 42 may include an aperture 46. Preferably, the aperture 46 is substantially circular.

As shown in FIGS. 6–10, the locking head 24 includes a strap entry face 48, a strap exit face 50, and a strap-receiving aperture 52 extending therebetween. The roof 38 and floor 54 diverge in the direction of the exit face 50. The ball 32 has a textured or roughened surface to increase its coefficient of friction with the strap 28. The ball 32 is captively held between the roof 38 and floor 54 by retention means comprising a finger 56 extending from the roof 38 towards the floor 54 adjacent the exit face 50. One end of the roof 38 joins the ceiling 40 adjacent the entry face 48 with spaced side wings 58 joining other parts of the roof 38 and ceiling 40.

Figure 6:
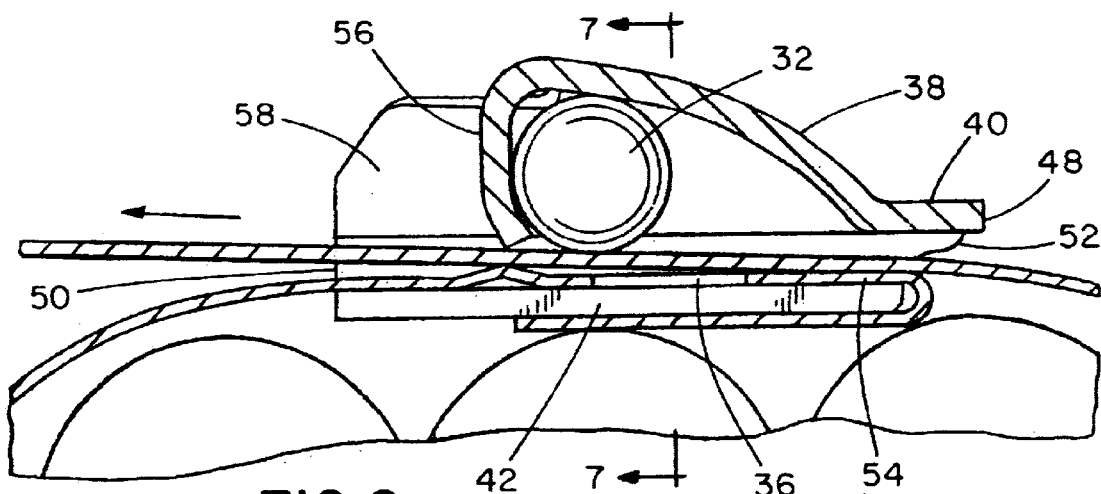
FIG. 6 is a sectional view of the strap threaded into the locking head with the locking ball in its threading position.
Figure 7:
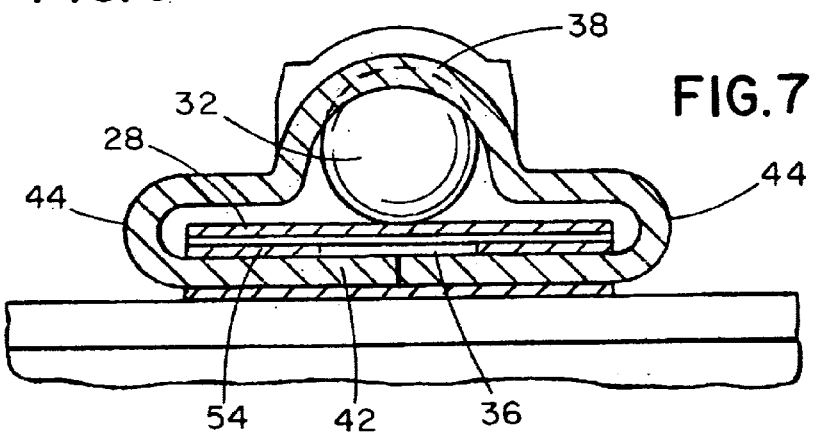
FIG. 7 is a sectional view taken along lines 7—7 of FIG. 6.
Figure 8:
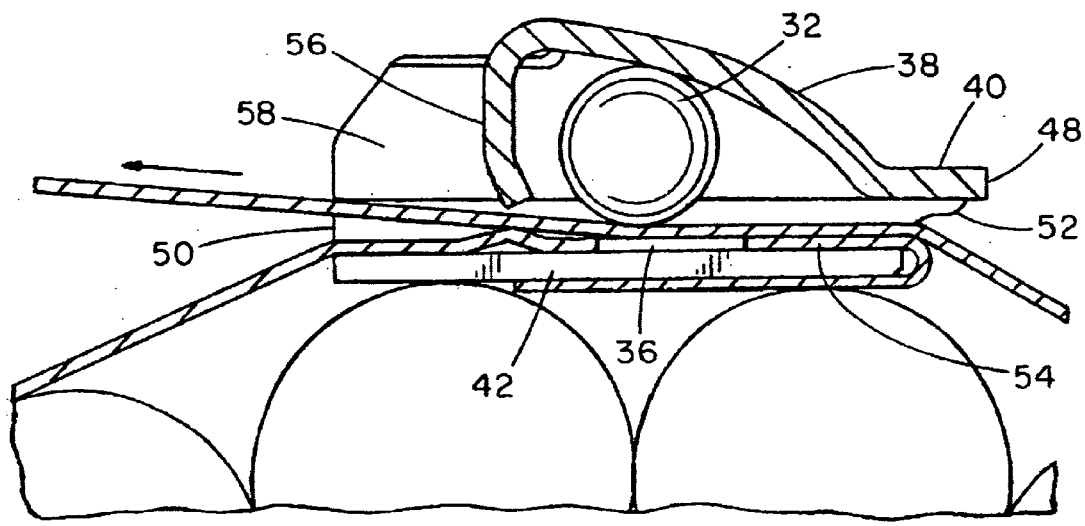
FIG. 8 is a view similar to FIG. 6 in which the locking ball is moving toward its locking position.
Figure 9:
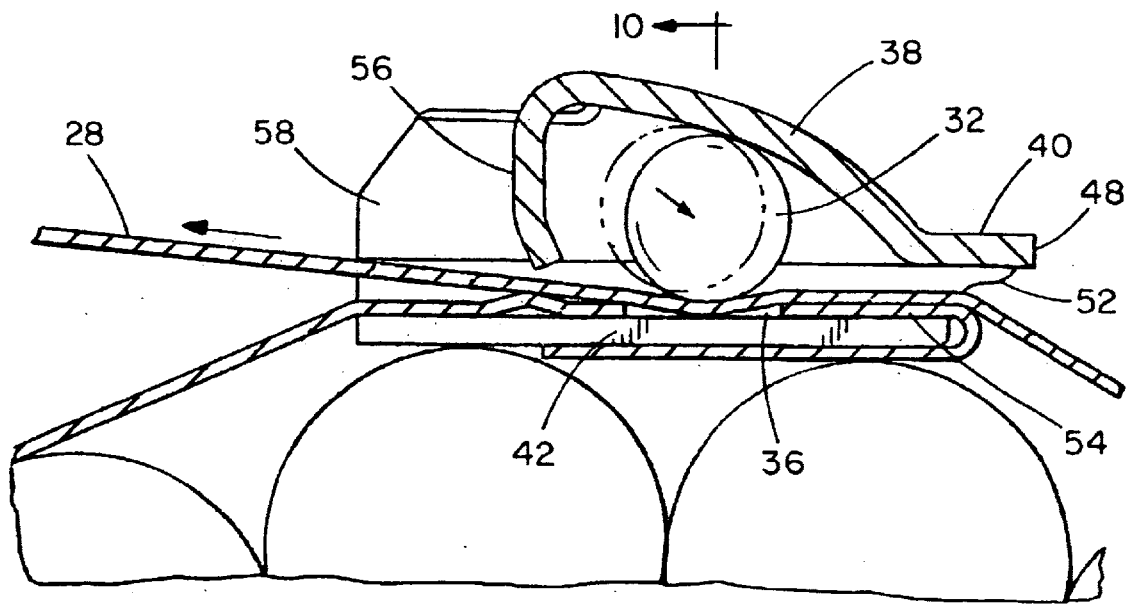
FIG. 9 is a sectional view of the strap and the locking head which depicts the locking ball in its locking position.
Figure 10:
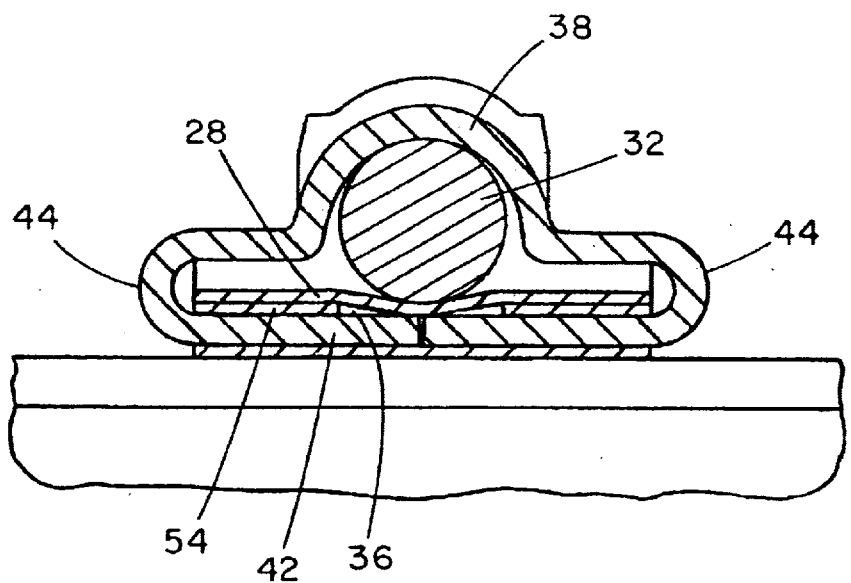
FIG. 10 is a sectional view taken along lines 10—10 of FIG. 9.

The locking ball 32 is movable between a threading position, shown in FIG. 6, wherein the ball 32 is disposed engaging finger 56 adjacent exit face 50 and a locking position, shown in FIG. 9, wherein the ball 32 is closer to entry face 48 and securely engages the threaded strap 28. In its threading position, the ball 32 concurrently engages the finger 56 and roof 38.

In operation, after the strap 28 is wrapped around the objects to be held, tip 60 is inserted into the locking head 24. Continued threading of the strap 28 results in positive engagement of the strap 28 and ball 32 at any angle the head 24 is held. After the strap 28 has been tightened and released, locking ball 32 moves to its locking position, shown in FIG. 9, where the strap 28 is compressively held between the ball 32 and the floor 54 resulting in the ball 32 deforming the threaded strap 28 into the aperture 36. Preferably, the diameter of the ball 32 is equal to or greater than the diameter of aperture 36.

As shown in FIG. 9, as the ball 32 sets in the head 24 for locking, it is disposed within the aperture 36 formed in the first end 24 of the strap 28. The force exerted by the ball 32 on the cable tie body forces the strap 28 to distort into the aperture 36 which creates metal interference that subsequently increases the locking strength of the cable tie 22. Preferably, aperture 36 is substantially circular and is positioned to provide mechanical locking force.

The disclosed invention provides a cable tie that utilizes a roller means as the locking mechanism. It should be noted that the above-described and illustrated embodiments and preferred embodiments of the invention are not an exhaustive listing of the forms such a cable tie in accordance with the invention might take; rather, they serve as exemplary and illustrative of embodiments of the invention as presently understood. By way of example, and without limitation, a cable tie strap having more than one aperture is contemplated to be within the scope of the invention. Many other forms of the invention are believed to exist.

What is claimed is:

1. A cable tie, comprising:
   an elongate metallic strap having a first end and a second end opposite the first end;
   a metallic locking head secured to the first end of the strap for receiving the second end of the strap, the head comprising a strap entry face, a strap exit face, and a strap-receiving aperture extending therebetween, the head further comprising a floor and a roof which diverge in the direction of the exit face; and
   metallic roller means for lockingly engaging the strap, the head comprising retention means disposed adjacent the exit face for captively holding the roller means within the head,
   the roller means being movable between a threading position wherein the roller means is disposed adjacent the exit face and the retention means, and a locking position wherein the roller means is closer to the entry face;
   wherein the first end of the strap comprises an aperture disposed beneath the locking position of the roller means.

2. The cable tie of claim 1 wherein the strap and the head are made of stainless steel.

3. The cable tie of claim 1 wherein the strap is coated.

4. The cable tie of claim 1 wherein the roller means comprises a ball.

5. The cable tie of claim 4 wherein the aperture is substantially circular.

6. The cable tie of claim 5 wherein the ball has a diameter, the diameter of the ball is equal to or greater than the diameter of the aperture.

7. The cable tie of claim 1 wherein the retention means comprises a finger extending from the roof adjacent the exit face.

8. The cable tie of claim 1 wherein the strap has a width and the aperture has a width, the width of the strap is at least twice the width of the aperture.

9. A cable tie, comprising:
   an elongate metallic strap having a first end and a second end opposite the first end;
   a metallic locking head secured to the first end of the strap for receiving the second end of the strap, the head comprising a strap entry face, a strap exit face, and a strap-receiving aperture extending therebetween, the head further comprising a floor and a roof which diverge in the direction of the exit face; and
   a metallic ball for lockingly engaging the strap, wherein the ball has a diameter the head comprising retention means disposed adjacent the exit face for captively holding the ball within the head;
   the ball being movable between a threading position wherein the ball is disposed adjacent the exit face and the retention means, and a locking position wherein the ball is closer to the entry face;
   wherein the first end of the strap comprises a substantially circular aperture disposed within the locking head, wherein the diameter of the ball is equal to or greater than the diameter of the aperture.

10. The cable tie of claim 9 wherein the aperture is disposed beneath the locking position of the ball.

11. The cable tie of claim 9 wherein the strap and the bead are made of stainless steel.

12. The cable tie of claim 9 wherein the strap is coated.

13. The cable tie of claim 9 wherein the retention means comprises a finger extending from the roof adjacent the exit face.

14. The cable tie of claim 9 wherein the strap has a width and the aperture has a width, the width of the strap is at least twice the width of the aperture.

15. A cable tie, comprising:
   an elongate metallic strap having a first end and a second end opposite the first end;
   a metallic locking head secured to the first end of the strap for receiving the second end of the strap, the head comprising a strap entry face, a strap exit face, and a strap-receiving aperture extending therebetween, the head further comprising a floor and a roof which diverge in the direction of the exit face; and
   metallic roller means for lockingly engaging the strap, the head comprising retention means disposed adjacent the exit face for captively holding the roller means within the head;
   the roller means being movable between a threading position wherein the roller means is disposed adjacent the exit face and the retention means, and a locking position wherein the roller means is closer to the entry face;
   wherein the first end of the strap comprises a first aperture disposed beneath the locking position of the roller means;
   wherein the head has a bottom wall and a second aperture disposed within the bottom wall.

16. The cable tie of claim 15 wherein the strap and the head are made of stainless steel.

17. The cable tie of claim 15 wherein the strap is coated.

18. The cable tie of claim 15 wherein the roller means comprises a ball.

19. The cable tie of claim 18 wherein the second aperture is substantially circular.

20. The cable tie of claim 19 wherein the ball has a diameter and the second aperture has a diameter, the diameter of the ball is equal or greater than the diameter of the second aperture.

21. The cable tie of claim 15 wherein the retention means comprises a finger extending from the roof adjacent the exit face.

22. The cable tie of claim 15 wherein the strap has a width and the first aperture has a width, the width of the strap is at least twice the width of the first aperture.

23. The cable tie of claim 15 wherein the second aperture is disposed beneath the first aperture.

* * * * *